(12) United States Patent
Martin et al.

(10) Patent No.: US 7,594,413 B2
(45) Date of Patent: Sep. 29, 2009

(54) REFRIGERATOR ICE COMPARTMENT LATCH

(75) Inventors: Dean A. Martin, Solon, IA (US); Chad J. Rotter, Amana, IA (US)

(73) Assignee: Maytag Corporation, Benton Harbor, MI (US)

( * ) Notice: Subject to any disclaimer, the term of this patent is extended or adjusted under 35 U.S.C. 154(b) by 496 days.

(21) Appl. No.: 11/421,779

(22) Filed: Jun. 2, 2006

(65) Prior Publication Data

US 2006/0260348 A1      Nov. 23, 2006

Related U.S. Application Data

(63) Continuation of application No. 11/331,883, filed on Jan. 13, 2006, which is a continuation-in-part of application No. 11/139,237, filed on May 27, 2005, now Pat. No. 7,337,620, which is a continuation-in-part of application No. 11/131,701, filed on May 18, 2005, now Pat. No. 7,284,390.

(51) Int. Cl.
*F25C 5/18*     (2006.01)
(52) U.S. Cl. ........... 62/344; 292/DIG. 37; 292/DIG. 71
(58) Field of Classification Search ........... 62/340–356; 292/DIG. 37, DIG. 71
See application file for complete search history.

(56) References Cited

U.S. PATENT DOCUMENTS 2,139,441 A    12/1938   Clark
2,223,947 A    12/1940   Blood et al.

(Continued)

FOREIGN PATENT DOCUMENTS

EP          657706 A1     6/1995

(Continued)

OTHER PUBLICATIONS

Brain, Marshall "How Refrigerators Work" http://home.howstuffworks.com/refrigerator.htm/printable, 6 pages, Feb. 4, 2005.

(Continued)

*Primary Examiner*—William E Tapolcai
(74) *Attorney, Agent, or Firm*—Kirk W. Goodwin; McKee, Voorhees & Sease, P.L.C.

(57) ABSTRACT

An insulated icemaking compartment is provided in the fresh food compartment of a bottom mount refrigerator. The icemaking compartment may be integrally formed with the liner of the fresh food compartment, or alternatively, may be modular for installation anywhere in the fresh food compartment. A removable bin assembly with a front cover normally seals the icemaking compartment to maintain the temperature in the compartment. A cold air duct formed in the rear wall of the refrigerator supplies cold air from the freezer compartment to the icemaking compartment. A return air duct directs a portion of the air from the icemaking compartment back to the freezer compartment. An air vent with a damper in the icemaking compartment directs another portion of air into the fresh focm 8od compartment. A control system provides for controlling refrigerator functions in a manner that promotes energy efficiency, including movement of the damper between open and closed positions. An improved latch and seal are provided for the ice bin assembly to allow removal of the bin assembly and to ensure a positive seal between the bin assembly and the front cover of the ice compartment.

9 Claims, 15 Drawing Sheets

U.S. PATENT DOCUMENTS

| | | |
|---|---|---|
| 2,256,551 A | 9/1941 | Colvin |
| 2,400,634 A | 5/1946 | Earle |
| 2,410,334 A | 10/1946 | Brace |
| 2,493,488 A | 1/1950 | Jordan et al. |
| 2,544,394 A | 3/1951 | Muffly |
| 2,605,621 A | 9/1952 | Kellershon |
| 2,717,505 A | 9/1955 | Andersson |
| 2,765,633 A | 10/1956 | Muffly |
| 2,774,224 A | 12/1956 | Bayston |
| 2,779,165 A | 1/1957 | Pichler |
| 2,795,117 A | 6/1957 | Herndon et al. |
| 2,907,180 A | 10/1959 | Mann |
| 3,046,754 A | 7/1962 | Kniffin |
| 3,100,970 A | 8/1963 | Elfving |
| 3,126,714 A | 3/1964 | Zuercher |
| 3,146,601 A | 9/1964 | Gould |
| 3,146,606 A | 9/1964 | Grimes et al. |
| 3,182,464 A | 5/1965 | Archer |
| 3,192,726 A | 7/1965 | Newton |
| 3,225,559 A | 12/1965 | Fischer |
| 3,226,939 A | 1/1966 | Harbison |
| 3,270,519 A | 9/1966 | Pohl |
| 3,308,631 A | 3/1967 | Kniffin |
| 3,339,956 A * | 9/1967 | Bencene et al. ............. 292/127 |
| 3,382,682 A | 5/1968 | Frohbieter |
| 3,440,308 A | 4/1969 | Carbary et al. |
| 3,541,806 A | 11/1970 | Jacobs |
| 3,581,516 A | 6/1971 | Buchser |
| 3,602,007 A | 8/1971 | Drieci |
| 3,633,374 A | 1/1972 | Canter |
| 3,654,772 A | 4/1972 | Curry, III |
| 3,745,779 A | 7/1973 | Bright |
| 3,747,363 A | 7/1973 | Grimm |
| 3,775,994 A | 12/1973 | Linstromberg |
| 3,788,089 A | 1/1974 | Graves |
| 3,789,620 A | 2/1974 | Benasutti |
| 3,821,881 A | 7/1974 | Harkias |
| 3,834,177 A | 9/1974 | Scarlett |
| 3,850,008 A | 11/1974 | Frazier |
| 3,866,434 A | 2/1975 | Pugh |
| 3,889,888 A | 6/1975 | Prada |
| 4,003,214 A | 1/1977 | Schumacher |
| 4,007,600 A | 2/1977 | Simms |
| 4,020,644 A | 5/1977 | True, Jr. |
| 4,087,140 A * | 5/1978 | Linstromberg ............... 312/292 |
| 4,098,094 A * | 7/1978 | Linstromberg ................ 62/344 |
| 4,100,761 A * | 7/1978 | Linstromberg et al. ........ 62/137 |
| 4,118,451 A | 10/1978 | Schaus |
| 4,142,373 A | 3/1979 | Weibel |
| 4,142,377 A | 3/1979 | Fogt |
| 4,142,378 A | 3/1979 | Bright |
| 4,227,383 A | 10/1980 | Horvay |
| 4,250,923 A | 2/1981 | Johnson |
| 4,280,682 A | 7/1981 | Zukausky |
| 4,285,212 A | 8/1981 | Prada |
| 4,306,757 A | 12/1981 | Horvay et al. |
| 4,332,146 A | 6/1982 | Yamazaki |
| 4,487,024 A | 12/1984 | Fletcher et al. |
| 4,587,810 A | 5/1986 | Fletcher |
| 4,614,088 A | 9/1986 | Brooks |
| 4,644,753 A | 2/1987 | Burke |
| 4,722,199 A * | 2/1988 | Hibino ........................ 62/344 |
| 4,727,720 A | 3/1988 | Wernicki |
| 4,754,615 A | 7/1988 | Linstromberg |
| 4,756,165 A | 7/1988 | Chestnut et al. |
| 4,799,362 A | 1/1989 | Chestnut |
| 4,831,840 A | 5/1989 | Fletcher |
| 4,872,317 A | 10/1989 | Reed |
| 4,889,316 A | 12/1989 | Donahue, Jr. |
| 4,916,921 A | 4/1990 | Fletcher |
| 4,922,725 A | 5/1990 | Rasmussen |
| 4,961,320 A | 10/1990 | Gutmann |
| 5,010,738 A | 4/1991 | Brown |
| 5,033,636 A | 7/1991 | Jenkins |
| 5,090,208 A | 2/1992 | Aono et al. |
| RE34,174 E | 2/1993 | Brown |
| 5,198,244 A | 3/1993 | Rice |
| 5,211,462 A | 5/1993 | Bien |
| 5,219,225 A | 6/1993 | Ball |
| 5,261,248 A | 11/1993 | Willis |
| 5,272,888 A | 12/1993 | Fisher |
| 5,273,219 A | 12/1993 | Beach |
| 5,310,090 A | 5/1994 | Taylor |
| 5,327,856 A | 7/1994 | Schroeder |
| 5,357,769 A | 10/1994 | Crabtree et al. |
| 5,375,432 A | 12/1994 | Cur |
| 5,596,182 A | 1/1997 | Edwards |
| 5,642,628 A | 7/1997 | Whipple, III et al. |
| 5,711,159 A | 1/1998 | Whipple, III |
| 5,758,512 A | 6/1998 | Peterson et al. |
| 5,787,723 A | 8/1998 | Mueller et al. |
| 5,810,331 A | 9/1998 | Smock |
| 5,823,001 A | 10/1998 | Patrick |
| 5,829,263 A | 11/1998 | Park |
| 5,834,126 A | 11/1998 | Sheu |
| 5,846,446 A | 12/1998 | Jackson |
| 5,849,227 A | 12/1998 | Chikugo et al. |
| 5,899,083 A | 5/1999 | Peterson et al. |
| 6,019,447 A | 2/2000 | Jackovin |
| 6,050,097 A | 4/2000 | Nelson |
| 6,053,472 A | 4/2000 | DeLand |
| 6,055,826 A | 5/2000 | Hiraoka et al. |
| 6,062,826 A | 5/2000 | Morimoto |
| 6,082,130 A | 7/2000 | Pastryk |
| 6,090,281 A | 7/2000 | Buckner |
| 6,091,062 A | 7/2000 | Phahnl et al. |
| 6,148,624 A | 11/2000 | Bishop |
| 6,286,324 B1 | 9/2001 | Pastryk |
| 6,312,608 B1 | 11/2001 | Buckner |
| 6,314,745 B1 | 11/2001 | Janke |
| 6,351,955 B1 | 3/2002 | Oltman |
| 6,351,958 B1 | 3/2002 | Pastryk |
| 6,351,967 B1 | 3/2002 | Adachi |
| 6,401,461 B1 | 6/2002 | Harrison et al. |
| 6,412,286 B1 | 7/2002 | Park et al. |
| 6,422,031 B1 | 7/2002 | Mandel et al. |
| 6,425,425 B2 | 7/2002 | Bianchi et al. |
| 6,438,988 B1 | 8/2002 | Paskey |
| 6,464,854 B2 | 10/2002 | Andrews et al. |
| 6,474,094 B2 | 11/2002 | Kim |
| 6,604,377 B2 | 8/2003 | Watanabe et al. |
| 6,612,116 B2 | 9/2003 | Fu et al. |
| 6,637,235 B2 | 10/2003 | Sakamoto et al. |
| 6,662,574 B2 | 12/2003 | Loibl et al. |
| 6,694,754 B1 | 2/2004 | Schenk et al. |
| 6,708,726 B2 | 3/2004 | Hashimoto |
| 6,725,680 B1 | 4/2004 | Schenk |
| 6,732,537 B1 | 5/2004 | Anell et al. |
| 6,735,959 B1 | 5/2004 | Najewicz |
| 6,755,166 B2 | 6/2004 | Chang |
| 6,810,680 B2 | 11/2004 | Pohl |
| 6,820,433 B2 | 11/2004 | Hwang |
| 6,845,631 B1 | 1/2005 | Hallin et al. |
| 6,880,355 B2 | 4/2005 | Jung |
| 6,964,177 B2 | 11/2005 | Lee et al. |
| 7,065,975 B1 | 6/2006 | Herndon et al. |
| 7,076,967 B2 | 7/2006 | Lee et al. |
| 7,437,885 B2 * | 10/2008 | Wu et al. ..................... 62/344 |
| 2002/0121096 A1 | 9/2002 | Harrison et al. |
| 2003/0046947 A1 | 3/2003 | Ohya et al. |
| 2005/0061016 A1 | 3/2005 | Lee et al. |

| | | | |
|---|---|---|---|
| 2006/0090496 A1 | 5/2006 | Adamski et al. | |

FOREIGN PATENT DOCUMENTS

| | | |
|---|---|---|
| EP | 1445558 | 11/2003 |
| EP | 1 482 263 A2 | 1/2004 |
| EP | 482263 | 1/2004 |
| EP | 1 517 103 A2 | 3/2005 |
| EP | 1 519 131 A1 | 3/2005 |
| GB | 2167544 | 10/1985 |
| GB | 2242731 A | 10/1991 |
| JP | 500 69644 | 6/1975 |
| JP | 0356113417 A | 9/1981 |
| JP | 2002228316 | 8/2002 |
| JP | 2003056966 A | 2/2003 |
| WO | WO 03/102481 A1 | 12/2003 |
| WO | WO 2004/085937 A1 | 10/2004 |

OTHER PUBLICATIONS

Adamski, Joseph R., U.S. Appl. No. 11/236,126, filed Sep. 27, 2005, Apparatus and Method for Dispensing Ice from a Bottom Mount Refrigerator.

Anderson, Ronald K., U.S. Appl. No. 11/140,100, filed May 27, 2005, Refrigerator With Improved Icemaker.

Coulter, Tim, U.S. Appl. No. 11/139,237, filed May 27, 2005, Insulated Ice Compartment for Bottom Mount Refrigerator.

* cited by examiner

US 7,594,413 B2

REFRIGERATOR ICE COMPARTMENT LATCH

CROSS-REFERENCE TO RELATED APPLICATIONS

This application is a Continuation application of U.S. Ser. No. 11/331,883 filed Jan. 13, 2006 which is a Continuation-In-Part of application of U.S. Ser. No. 11/139,237, filed May 27, 2005, entitled INSULATED ICE COMPARTMENT FOR BOTTOM MOUNT REFRIGERATOR, which is a Continuation-In-Part application of and U.S. Ser. No. 11/131,701, filed May 18, 2005, entitled REFRIGERATOR WITH INTERMEDIATE TEMPERATURE ICEMAKING COMPARTMENT, all of which are herein incorporated by reference in their entirety.

BACKGROUND OF THE INVENTION

Household refrigerators generally come in three structural styles: (1) a side-by-side model wherein the freezer and refrigerator compartments are side by side; (2) a top mount model wherein the freezer compartment is located above the refrigerator compartment; and (3) a bottom mount model wherein the freezer compartment is mounted below the refrigerator compartment. An icemaker is normally provided in the freezer compartment of all three models. A door mounted ice dispenser is often provided in a side-by-side refrigerator and in a top mount refrigerator so that a person can add ice to a glass without opening the freezer or refrigerator door. However, a door mounted ice dispenser normally is not been provided in bottom mount refrigerators, since the freezer door is too low, and there are difficulties in transporting ice from the freezer compartment to the refrigerator compartment which precludes a dispenser in the refrigerator compartment door. However, it is desirable to have an ice dispenser in the refrigerator compartment of a bottom mount refrigerator.

Providing an icemaking compartment within the fresh food compartment of a refrigerator presents numerous issues, both structural and functional. For example, the fresh food compartment is normally about 40° F., while an ice compartment needs to be less than 32° F. in order to make ice effectively and efficiently and is typically at, or about 0° F. Maintaining and controlling the temperature within the icemaking compartment requires insulation, seals, appropriate airflow, and a control system. Placing the icemaking compartment within the fresh food compartment of the refrigerator also requires consideration of electrical connections of the icemaker and the supply of water to the icemaker. The method of manufacturing of such an icemaking compartment within the fresh food compartment of a refrigerator also raises novel and unique considerations which are not factors for an icemaking compartment mounted in a freezer.

U.S. Pat. No. 6,735,959 issued to Najewicz discloses a thermoelectric icemaker placed within the fresh food compartment of a bottom mount refrigerator that may be dispensed through the fresh food door. Najewicz forms ice within the fresh food compartment using the thermoelectric icemaker even though the compartment is above a freezing temperature. Although Najewicz provides for a duct that runs from the freezer compartment to the thermoelectric icemaker, the cold air from the duct is used to remove heat from the thermoelectric icemaker. Najewicz has many problems that must be overcome in order to be practical including the removal of unfrozen water, rapid ice body formation, prolonged ice storage, etc. The present invention overcomes these problems.

SUMMARY OF THE INVENTION

Therefore it is a primary object, feature, or advantage of the present invention to improve over the state of the art.

A further object, feature, or advantage of the present invention is the provision of an improved refrigerator having an icemaking compartment within the fresh food compartment.

Another object, feature, or advantage of the present invention is the provision of a refrigerator having a separate icemaking compartment maintained at a temperature between 0° and 32° F.

A further object, feature, or advantage of the present invention is the provision of a refrigerator having an insulated icemaking compartment remote from the freezer compartment.

A further object, feature, or advantage of the present invention is the provision of a bottom mount refrigerator having an icemaking compartment in the fresh food compartment, and having an insulated and sealed front cover on the icemaking compartment which can be opened to provide access into the compartment.

A further object, feature, or advantage of the present invention is the provision of an icemaking compartment which is formed separately from and mounted into a fresh food compartment of a bottom mount refrigerator.

Another object, feature, or advantage of the present invention is the provision of a method of making a bottom mount refrigerator having an integral ice compartment formed in the liner of the fresh food compartment.

Still another object, feature, or advantage of the present invention is the provision of a control system for an ice compartment within the fresh food compartment of a refrigerator for controlling icemaking and dispensing.

Another object, feature, or advantage of the present invention is the provision of an icemaker in the refrigerator compartment of a bottom mount refrigerator, with a cold air duct to provide air from the freezer compartment to the icemaker.

Still another object, feature, or advantage of the present invention is the provision of an icemaker in the refrigerator compartment of a bottom mount refrigerator having efficient and timely icemaking capacity.

It is a still further object, feature, or advantage of the present invention to provide a refrigerator that is energy efficient.

Another object, feature, or advantage of the present invention is to provide a refrigerator that enhances safety.

Yet another object, feature, or advantage of the present invention is to provide a refrigerator that provides convenience to users.

A further object, feature, or advantage of the present invention is to provide a refrigerator that is aesthetically pleasing to users.

A still further object, feature, or advantage of the present invention is to provide a refrigerator with a control system design that minimizes the complexity and the number of components necessary.

One or more of these and/or other objects, features, or advantages of the present invention will become from the specification and claims that follow.

The bottom mount refrigerator of the present invention has an icemaker within an insulated icemaking compartment in the fresh food or refrigerator compartment. Cold air is supplied to the icemaking compartment from the freezer compartment via a cold air duct. A return air duct extends from the icemaking compartment to the freezer compartment. The icemaking compartment also includes a vent opening for venting air to the refrigerator compartment. A fan draws or forces air through the duct from the freezer compartment to the icemaking compartment. The temperature in the ice making compartment is between 0° F. to 32° F., which is colder than the temperature of the refrigerator compartment, but not as cold as the freezer compartment. The icemaking compartment is preferably located in an upper corner of the refrigerator compartment. The door of the refrigerator compartment includes an ice dispenser to supply ice to a person without opening the refrigerator compartment door. An ice bin for storing ice is removably mounted in the ice compartment.

Preferably, the icemaking compartment is formed integrally with the liner of the fresh food compartment. Alternatively, the icemaking compartment is formed separately from and mounted in the fresh food compartment. The icemaking compartment includes inner and outer shells, with insulation therebetween. An insulated front cover for the ice bin has a latch and seal which provide an air-tight seal with the icemaking compartment when the latch is locked. The latch can be unlocked to allow removal of the ice bin and to provide access to the icemaker.

DETAILED DESCRIPTION OF THE PREFERRED EMBODIMENT

Figure 1:
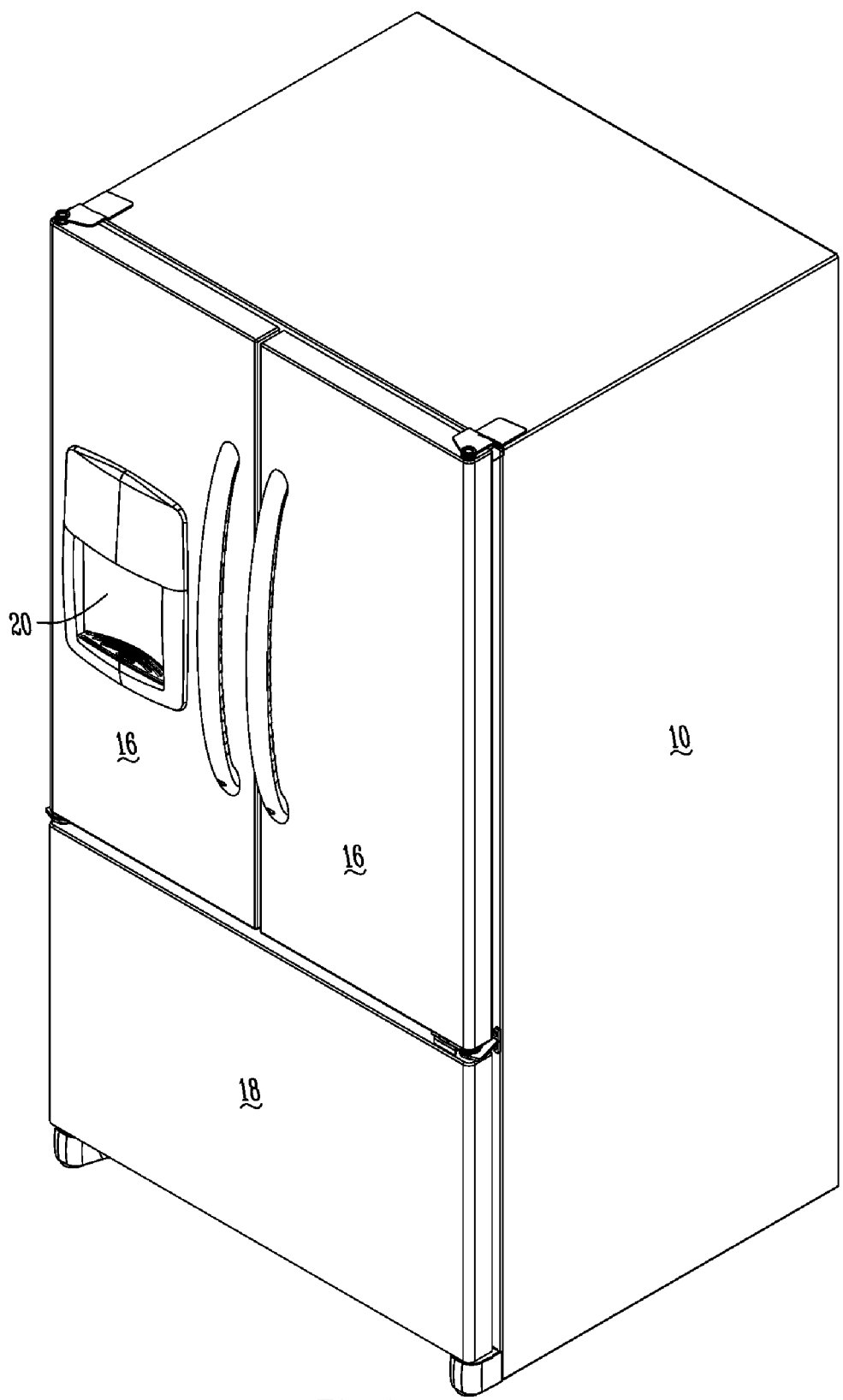
FIG. 1 is a perspective view of a bottom mount refrigerator according to the present invention.
Figure 2:
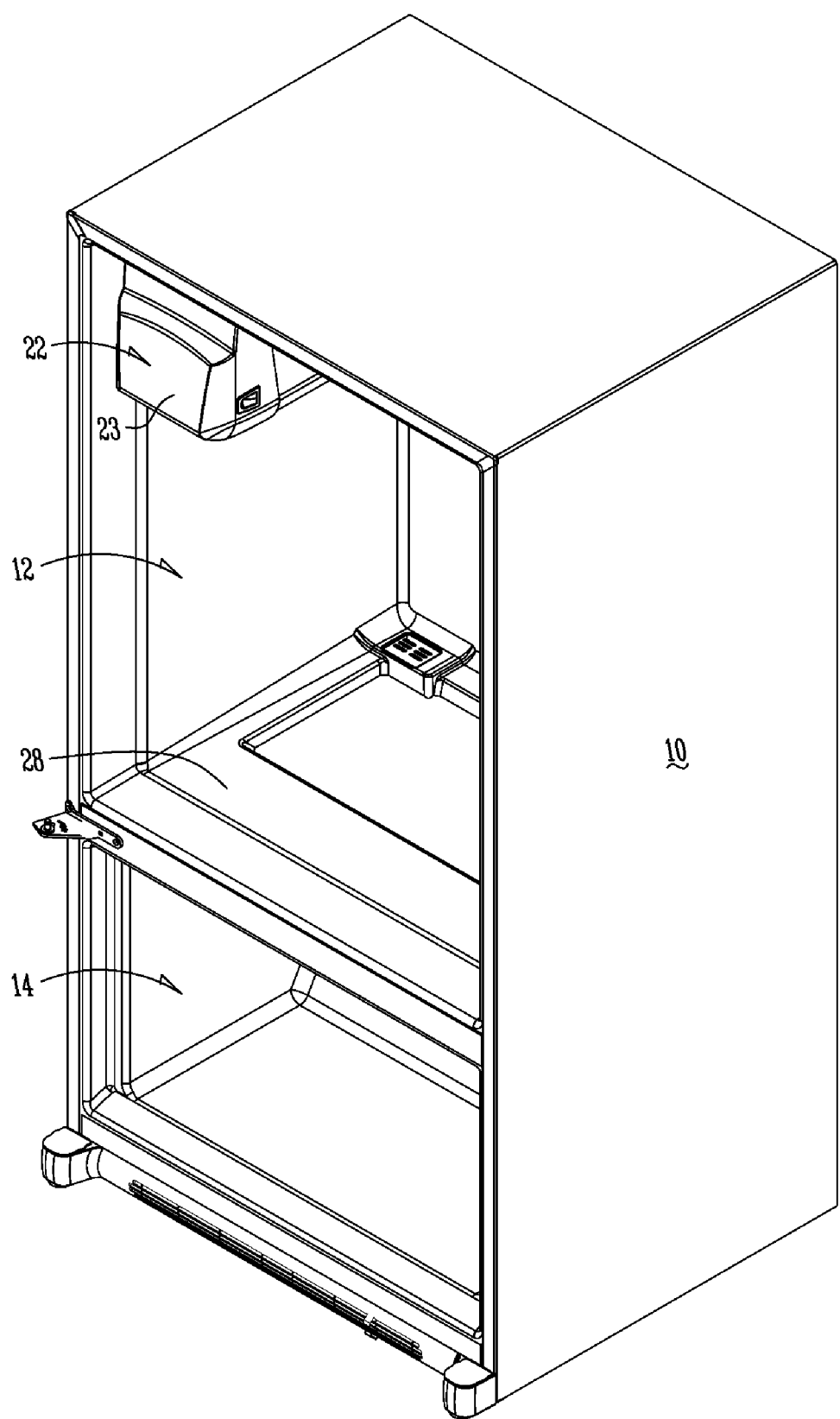
FIG. 2 is a perspective view of the bottom mount refrigerator having the doors removed.

A bottom mount refrigerator is generally designated in the drawings by the reference numeral 10. The refrigerator 10 includes a refrigerator or fresh food compartment 12 and a freezer compartment 14. Doors 16 are provided for the refrigerator compartment or fresh food compartment 12 and a door 18 is provided for the freezer compartment 14. One of the doors 16 includes an ice dispenser 20, which may also include a water dispenser.

Intermediate Temperature Icemaking Compartment

An icemaking compartment or intermediate compartment 22 is provided in the refrigerator compartment 12. The icemaking compartment 22 is shown to be in one of the upper comers of the refrigerator, or fresh food, compartment 12, but other locations are also within the scope of this invention. The icemaking compartment 22 has a front cover 23 that is insulated to prevent the cold air of the icemaking compartment 22 from passing into the refrigerator compartment and opening 21 is provided that mates with chute 19 of the ice dispenser 20. A seal may be provided between the opening 21 and chute 19 to prevent cold air from passing from the icemaking compartment to the refrigerator compartment 12. Chute 19 may be adapted to engage opening 21 upon closing of door 16. Chute 19 and opening 21 may be opposingly angled as to provide added sealing upon closing of door 16. Additionally, an intermediate piece may be used to improve the seal be between chute 19 and opening 21. For example, a resilient seal may be used to assist in achieving this seal. Alternatively, a spring or other elastic material or apparatus may be utilized between or about the junction of chute 19 and opening 21. Other alternatives for sealing between chute 19 and opening 21 should be evident to one skilled in the art.

Additionally, chute 19 should have a blocking mechanism located within or about it to assist in preventing or decreasing the flow of air or heat transfer within chute 19. For example, a flipper door that operates by a solenoid may be placed at the opening 21 to prevent cold air from leaving the icemaking compartment 22 and entering into the refrigerator compartment.

Preferably, the icemaking compartment 22 includes an icemaker 50 (as described below) that forms ice in an environment that is below freezing.

The icemaking compartment 22 may be integrally formed adjacent the refrigerator compartment 12 during the liner forming process and insulation filling process. In such a process the intermediate compartment may be separated on at least one side from the fresh food compartment by the refrigerator liner. Alternatively, the icemaking compartment 22 may be made or assembled remotely from the fresh food compartment and installed in the fresh food compartment 12. For example, this compartment 22 may be slid into the refrigerator compartment 12 on overhead rails (not shown) or other mounting. These methods are discussed subsequently.

The refrigerator 10 includes an evaporator 24 which cools the refrigerator compartment 12 and the freezer compartment 14. Normally, the refrigerator compartment 12 will be maintained at about 40° F. and the freezer compartment 14 will be maintained at approximately 0° F. The icemaking compartment is maintained at a temperature below 32° F. or less in order to form ice, but is preferably not as cold as the freezer compartment 14. Preferably this temperature is in the range of 20° F. The walls of the icemaking compartment are insulated to facilitate temperature control among other aspects. Grates or air vents 26 are provided in the wall 28 between the refrigerator compartment 12 and the freezer compartment 14 to allow air circulation between the compartments.

Air Ducts

A cold air duct 30 extends between the freezer compartment 14 and the icemaking or specialty compartment 22.

Figure 5:
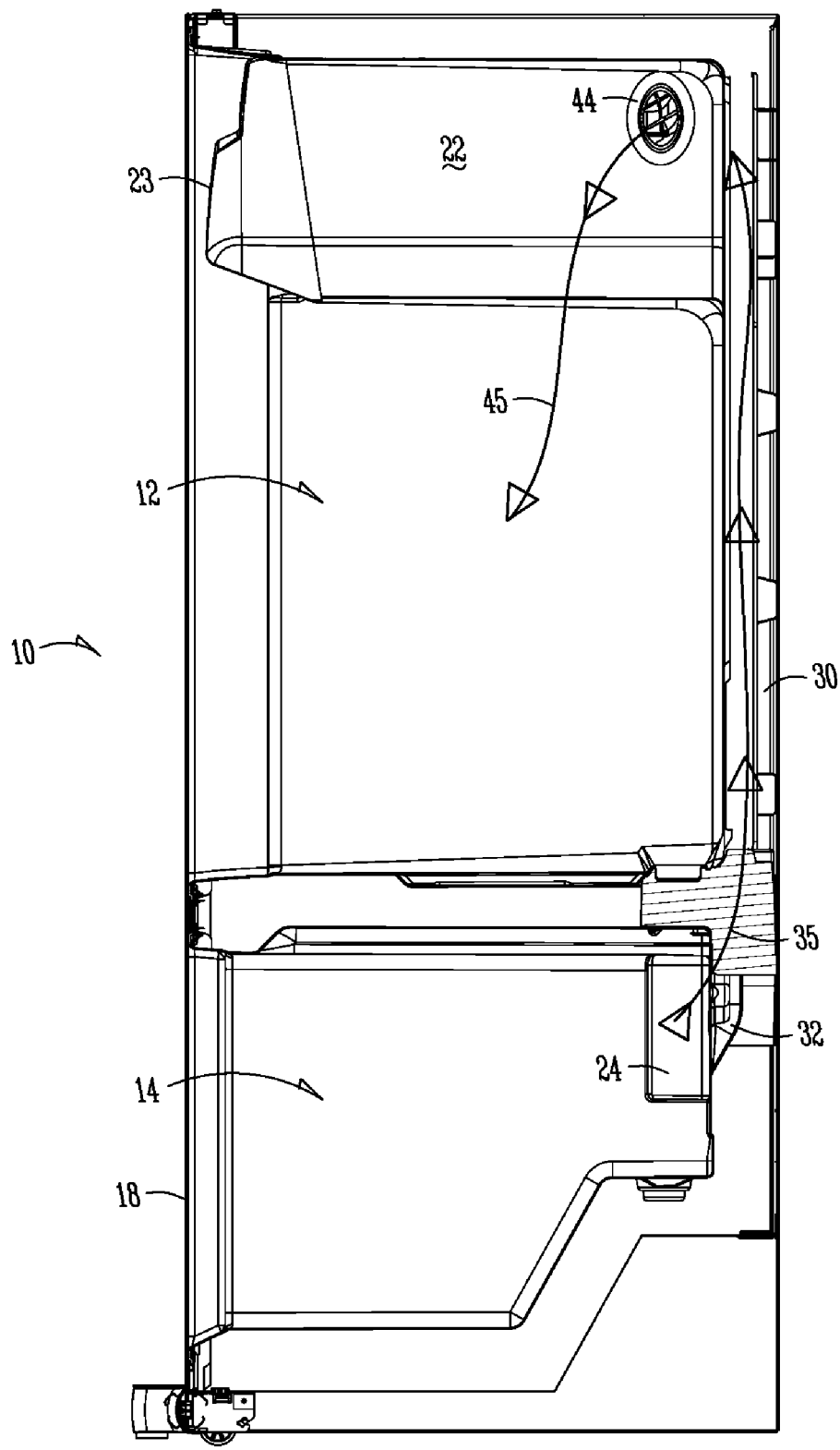
FIG. 5 is a sectional view taken along lines 5-5 of FIG. 4.

More particularly, the cold air duct 30 has a lower air inlet 32 within the freezer compartment 14 and an upper outlet end 34 connected to a fan 36 mounted on the back wall of the icemaker 22. The fan 36 draws cold air from the freezer compartment and forces the cold air into the icemaker 22 so as to facilitate icemaking. It is understood that the fan 36 may be located at the inlet end 32 of the cold air duct 30. The fan 36 controls the air flow from the freezer compartment 14 to the icemaking compartment 22 and may be a variable speed fan. The fan can be actuated by conventional means. The cold air duct 30 preferably resides within the rear wall of the refrigerator 10, as seen in FIG. 5. The arrow 35 designates the air flow through the cold air duct 30.

Figure 6:
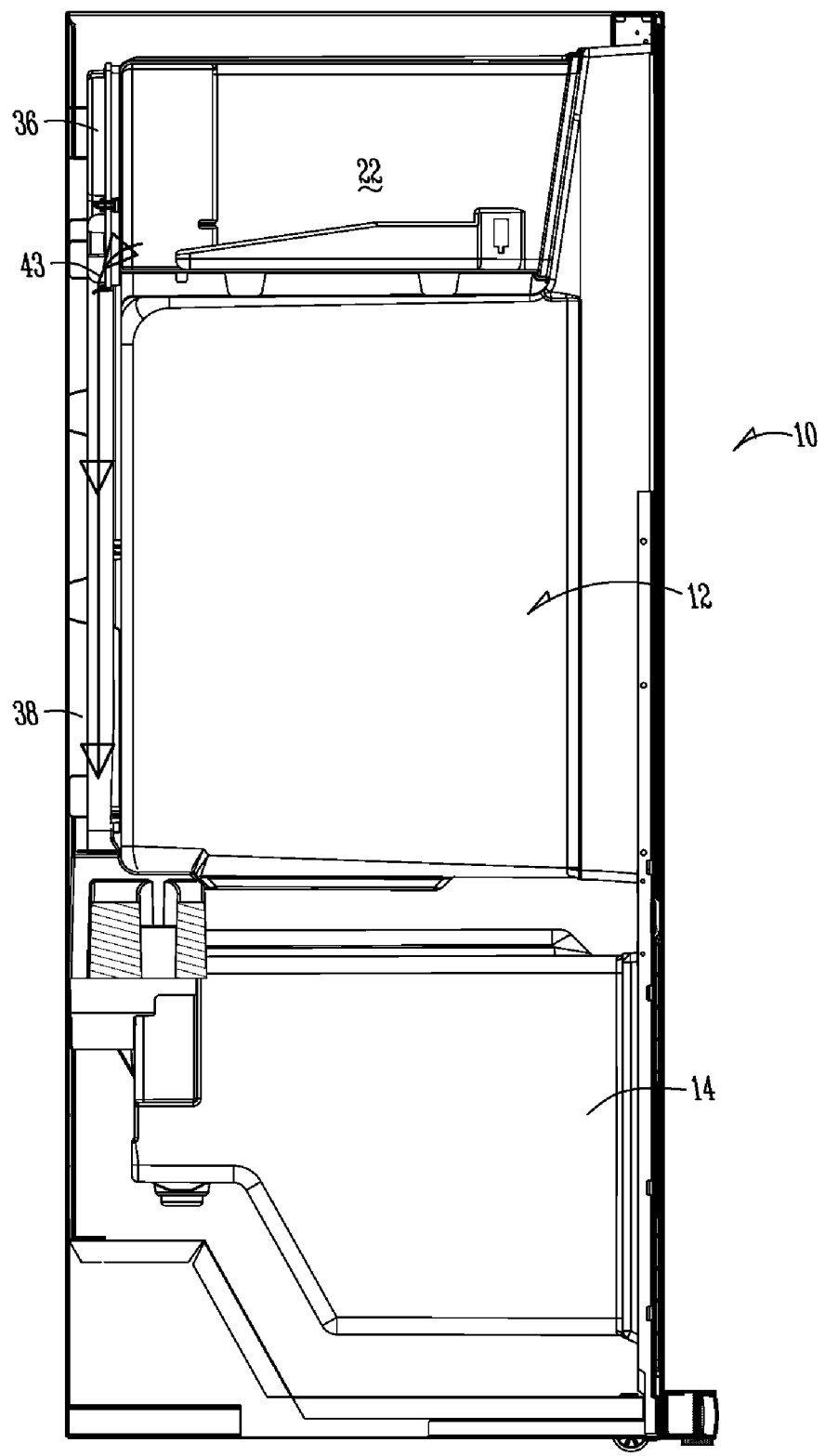
FIG. 6 is a sectional view taken along lines 6-6 of FIG. 4.

The refrigerator 10 also includes a return air duct 38 having an upper end 40 connected to the icemaker 22, and a lower end 42 terminating adjacent one of the air grates 26. Alternatively, the lower end 42 of the return air duct 38 may extend into the freezer compartment 14. Preferably, the return air duct 38 resides within the rear wall of the refrigerator 10, as seen in FIG. 6.

Figure 3:
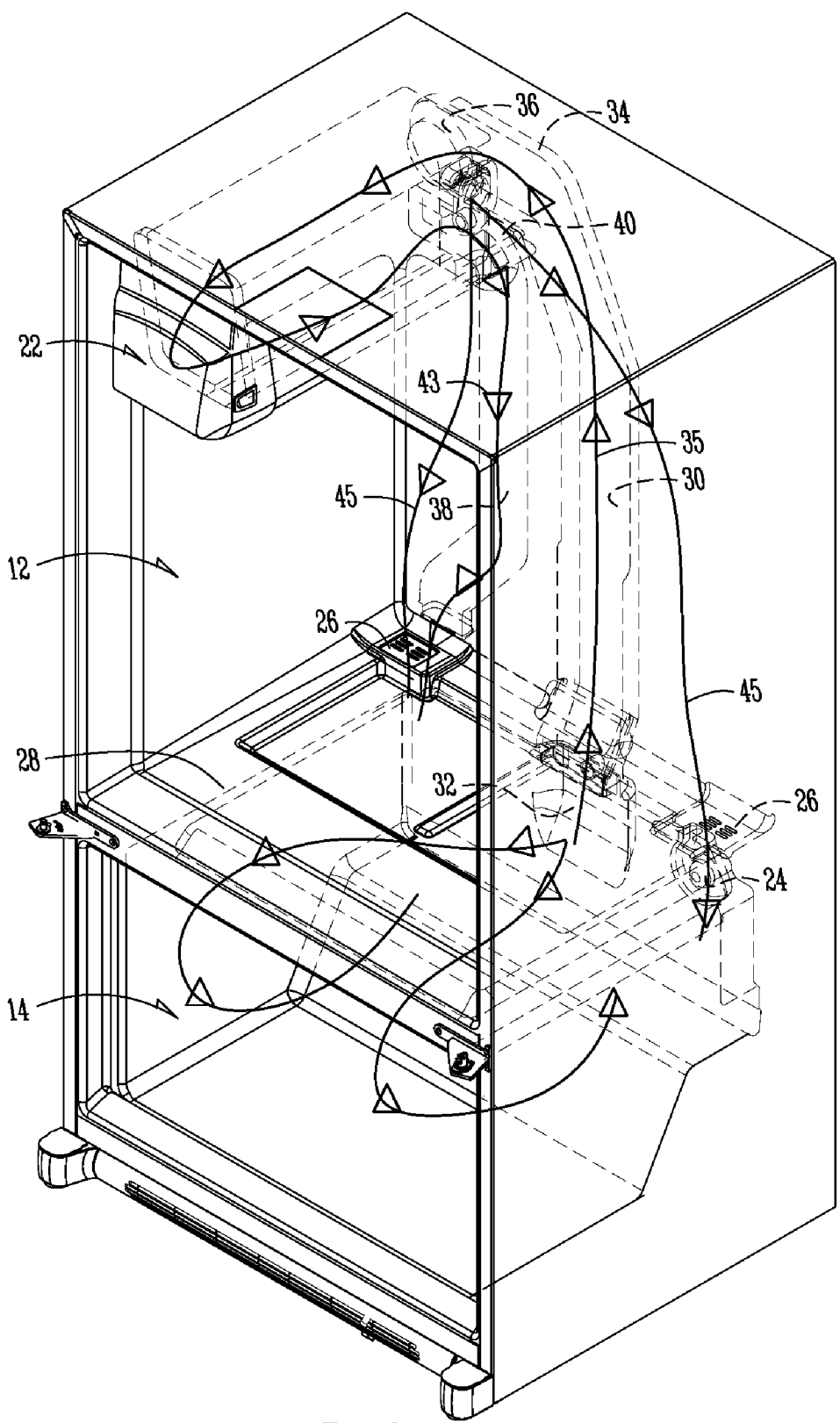
FIG. 3 is a view similar to FIG. 2 showing the cold air duct and return air duct for the icemaking compartment.

The icemaking compartment 22 also has an air vent for discharging air into the refrigerator compartment 14. Thus, a portion of the air from the icemaking compartment 22 is directed through the return air duct 38 to the freezer compartment 14, as indicated by arrow 43 in FIG. 3, and another portion of the icemaking compartment air is vented through the opening 44 into the refrigerator compartment 12, as indicated by arrows 45 in FIG. 3.

Figure 4:
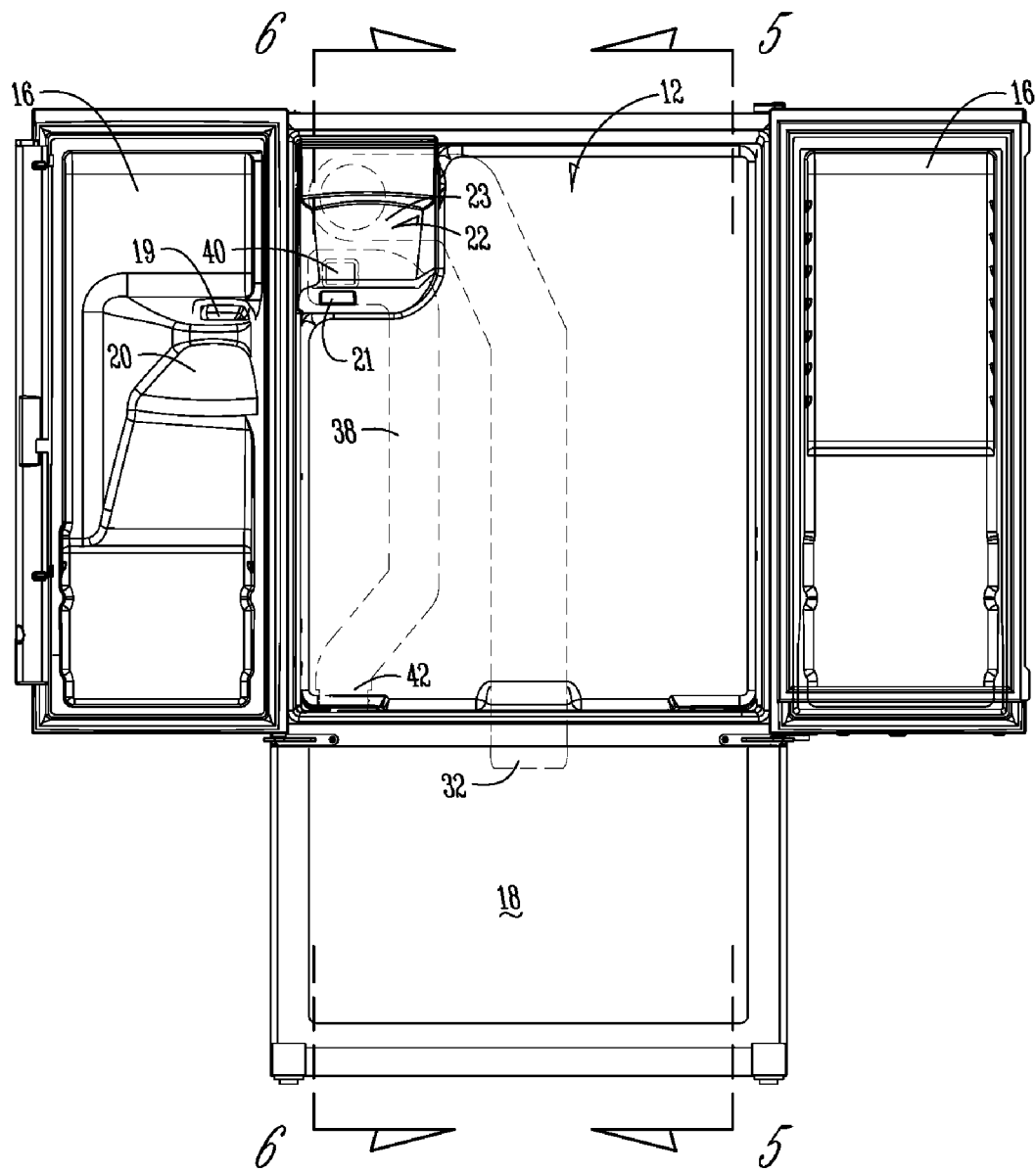
FIG. 4 is a front elevation view of the bottom mount refrigerator of the present invention with the doors open, and illustrating the cold air and return air ducts.

As seen in FIG. 4, the ice is discharged from the icemaker 22 in any conventional manner. Similarly, the ice dispenser 20 functions in a conventional manner.

Icemaker

Figure 7:
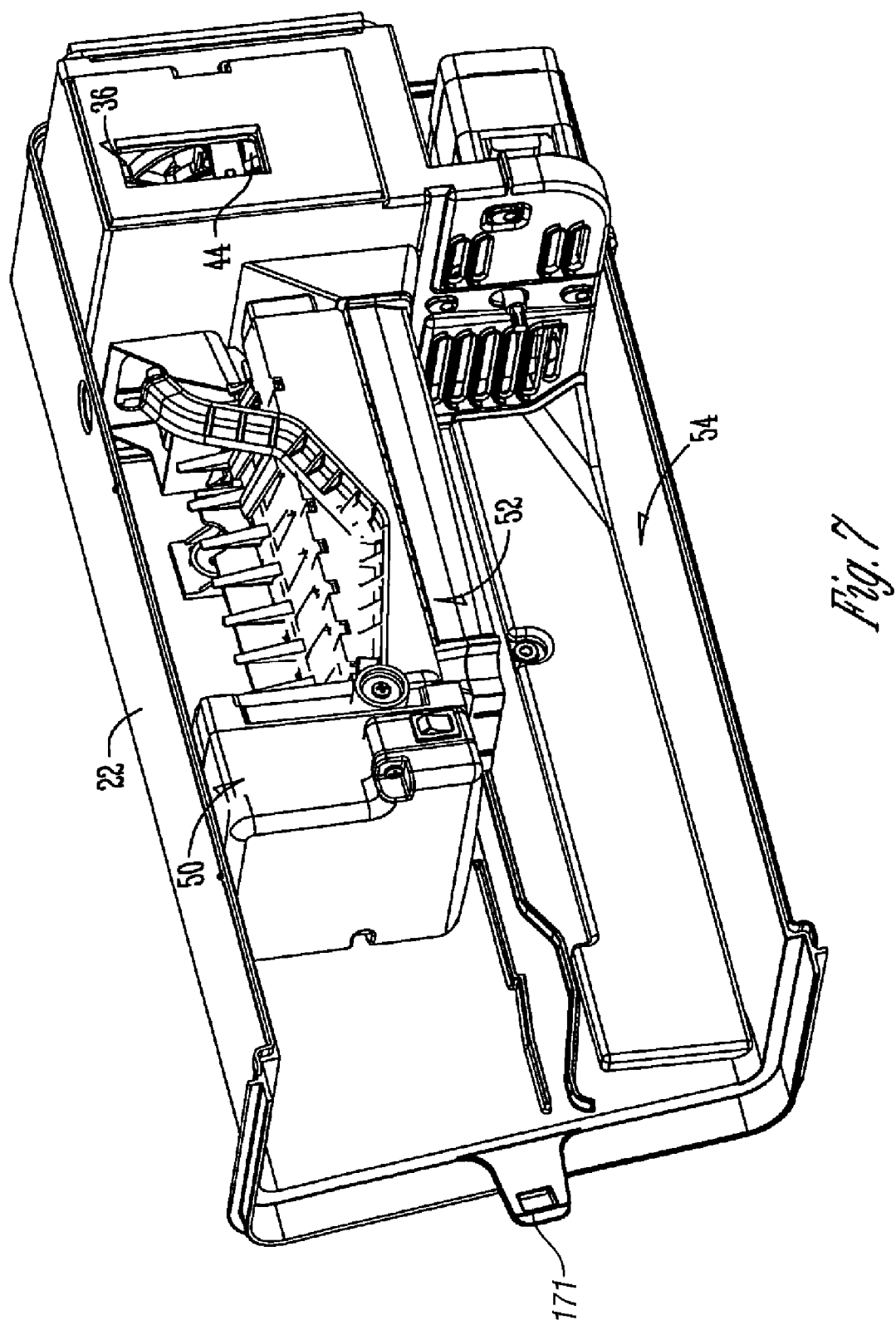
FIG. 7 is a perspective view of the icemaker positioned within the icemaking compartment.
Figure 8:
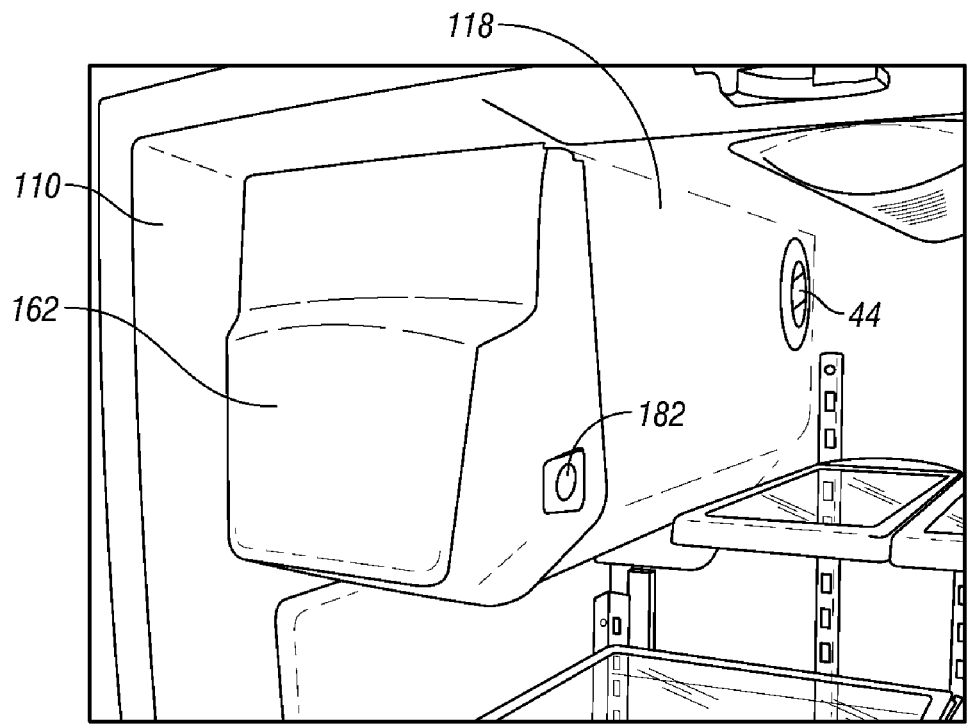
FIG. 8 is a perspective view from the front of the icemaker showing the bin and front cover in a closed position.
Figure 9:
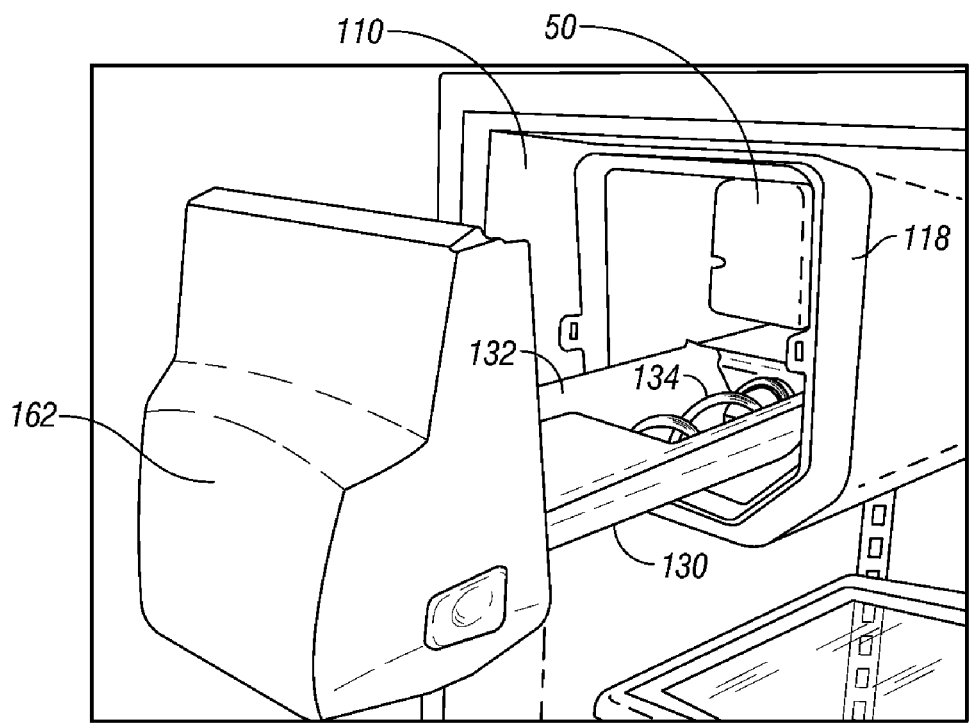
FIG. 9 is a view similar to FIG. 14 showing the bin and front cover in an open position.

As seen in FIG. 7, an icemaker 50 is positioned within the icemaking compartment 22 with the ice storage area 54 with auger (not shown) removed for clarity. The icemaker 50 is mounted to an impingement duct 52. The impingement duct receives freezer air coming from the freezer compartment through the cold air duct 30 and the fan assembly 36. The opening 44 vents air into the refrigerator compartment 12. The auger assembly (not shown) is provided beneath the icemaker 50 along with an ice storage bin with an insulated cover 23. Impingement on the ice maker, as well as other aspects of ice making, is disclosed in Applicant's U.S. application Ser. No. 11/131,701 filed May 18, 2005 entitled REFRIGERATOR WITH IMPROVED ICEMAKER and is hereby incorporated by reference.

Ice Bin Assembly

Figure 10:
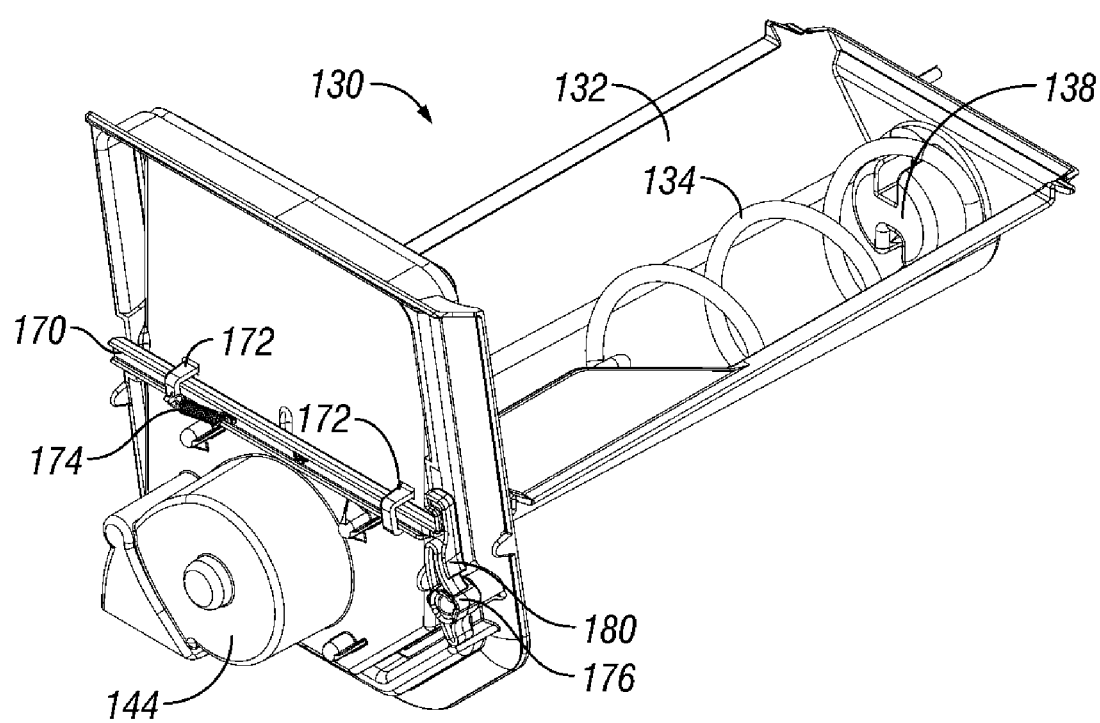
FIG. 10 is a perspective view of the ice pan, auger and motor assembly.
Figure 11:
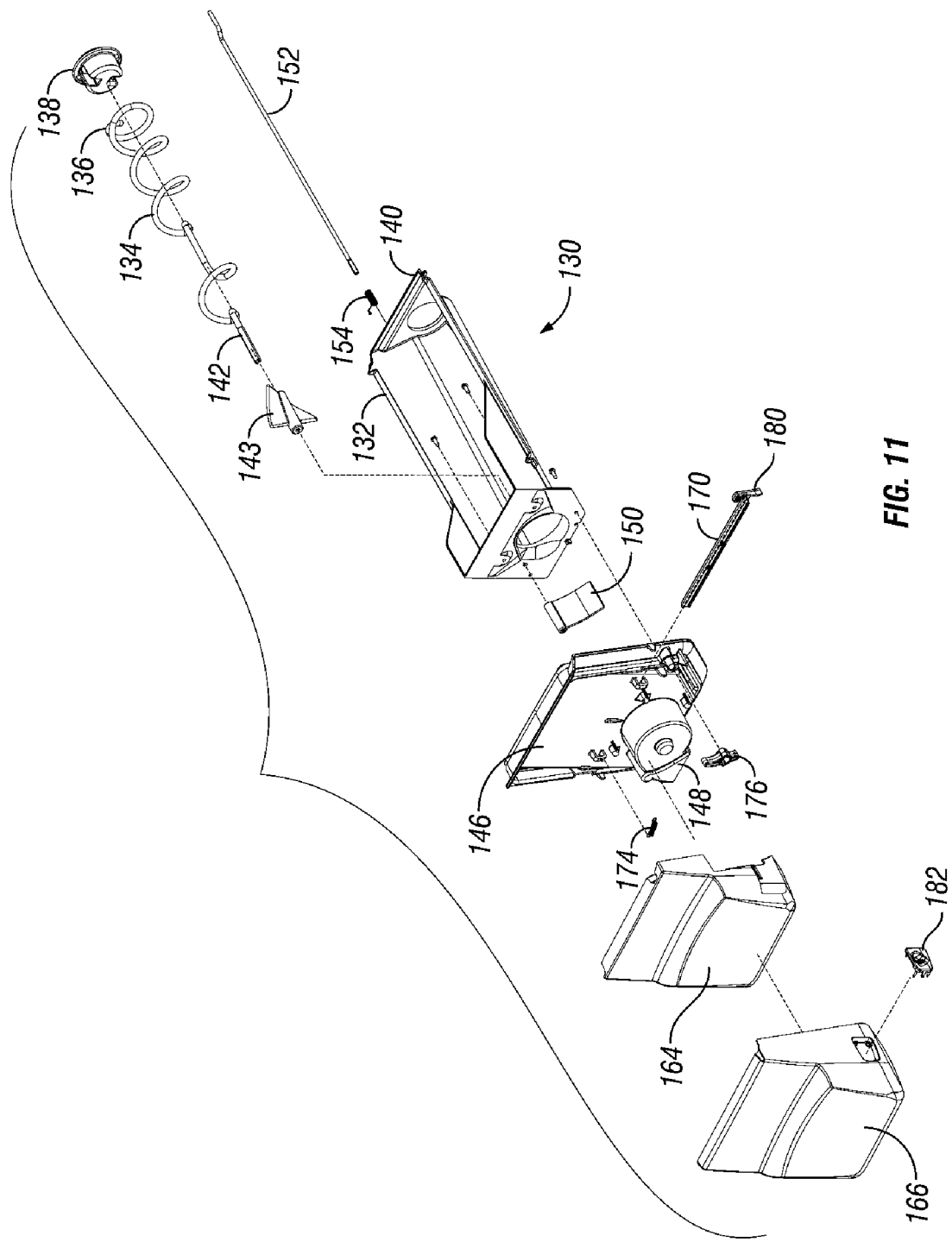
FIG. 11 is an exploded view of the ice pan, auger and motor assembly.

The ice compartment 22 also includes an ice bin assembly 130. The assembly 130 is removable for assembly, service, and user access to bulk ice storage. The components of the bin assembly 130 are shown in FIGS. 10 and 11. The bin assembly 130 includes a tray or bin 132 for receiving ice from the icemaker 50. An auger 134 is mounted within the tray 132, with the first end 136 of the auger 134 being received in a motor 138 which is mounted in the upstream end 140 of the tray 132. The second end 142 of the auger 134 is mounted in a housing 144 on a front plate 146 of the bin assembly 130. A short piece of auger flighting 143 is provided on the second end 142 of the auger 134, within the housing 144. The housing 144 includes an outlet opening 148, with a flipper door 150 in the housing 144 to control opening and closing of the outlet opening 148. The flipper door 150 is mounted upon a shaft 152 extending through the tray 132. A spring 154 mounted on the shaft 152 engages the flipper door 150 to normally bias the door 150 to a closed position over the outlet opening 148. The shaft 152 can be turned by a solenoid (not shown) so as to move the flipper door 150 to an open position relative to the outlet opening 148, such that ice can be discharged from the tray 132 to the dispenser 20.

Front Cover Seal

Figure 12:
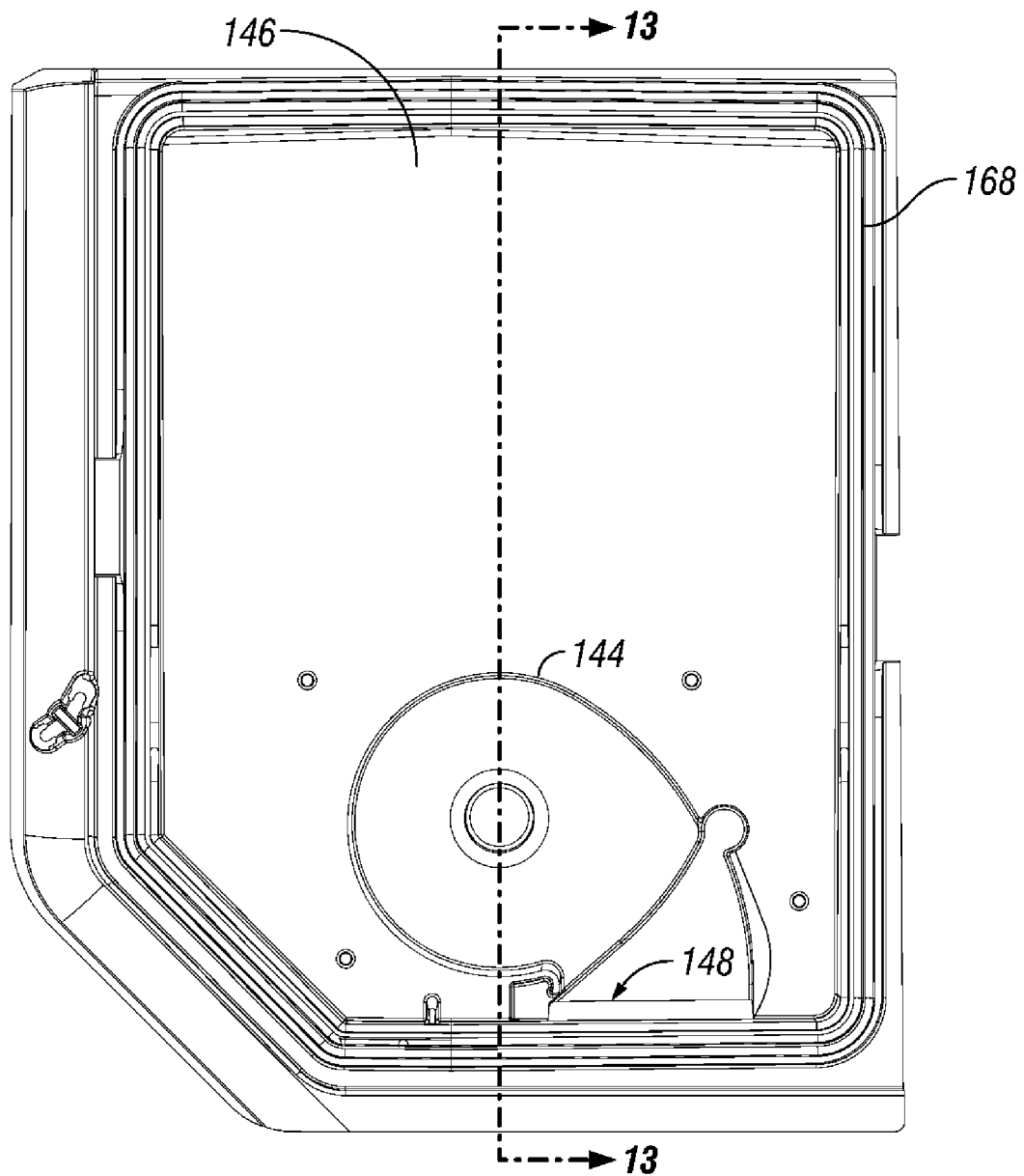
FIG. 12 is a rear elevation view of the bin assembly seal for the icemaking compartment.
Figure 13:
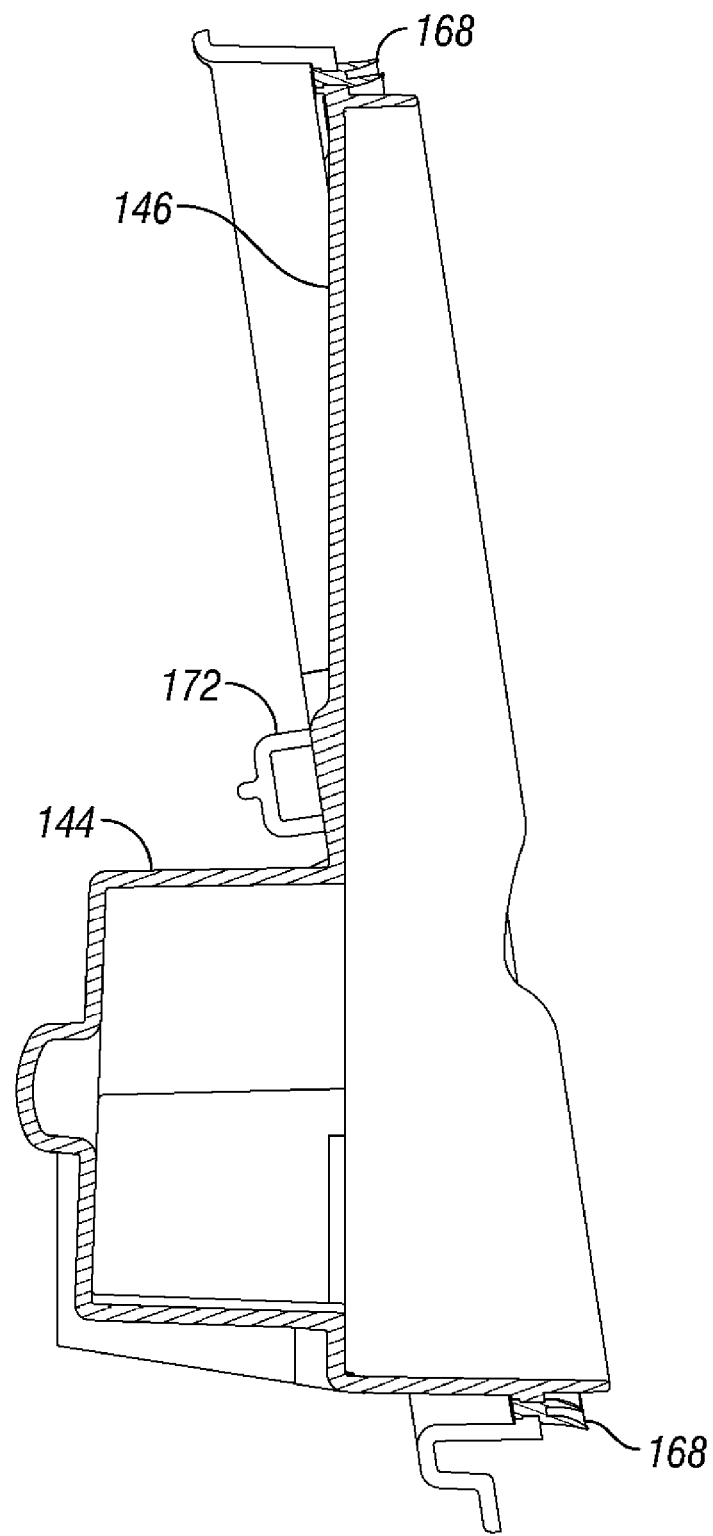
FIG. 13 is a sectional view taken along lines 25-25 of FIG. 12.

A two-piece front cover 162 is provided on the bin assembly 130. The front cover 162 includes an inner panel 164 and an outer panel 166, as best seen in FIG. 11. Insulation is provided between the inner and outer panels 164, 166, such that the front cover 162 is insulated. The inner panel 164 mounts onto the front plate 146 of the bin assembly 130. A seal or compressible gasket 168 (FIG. 12) is provided around the outer perimeter of the front plate 146 so that when the bin assembly 130 is installed into the ice box 122, an air-tight seal is provided between the bin assembly 130 and the front opening 120 of the ice compartment 22. The seal 168 helps maintain the lower temperature of the icemaking compartment 22, as compared to the higher temperature of the fresh food compartment 12. Since the ice compartment 22 is at a lower temperature than the fresh food compartment 12, the two components must be sealed from one another.

Figure 14:
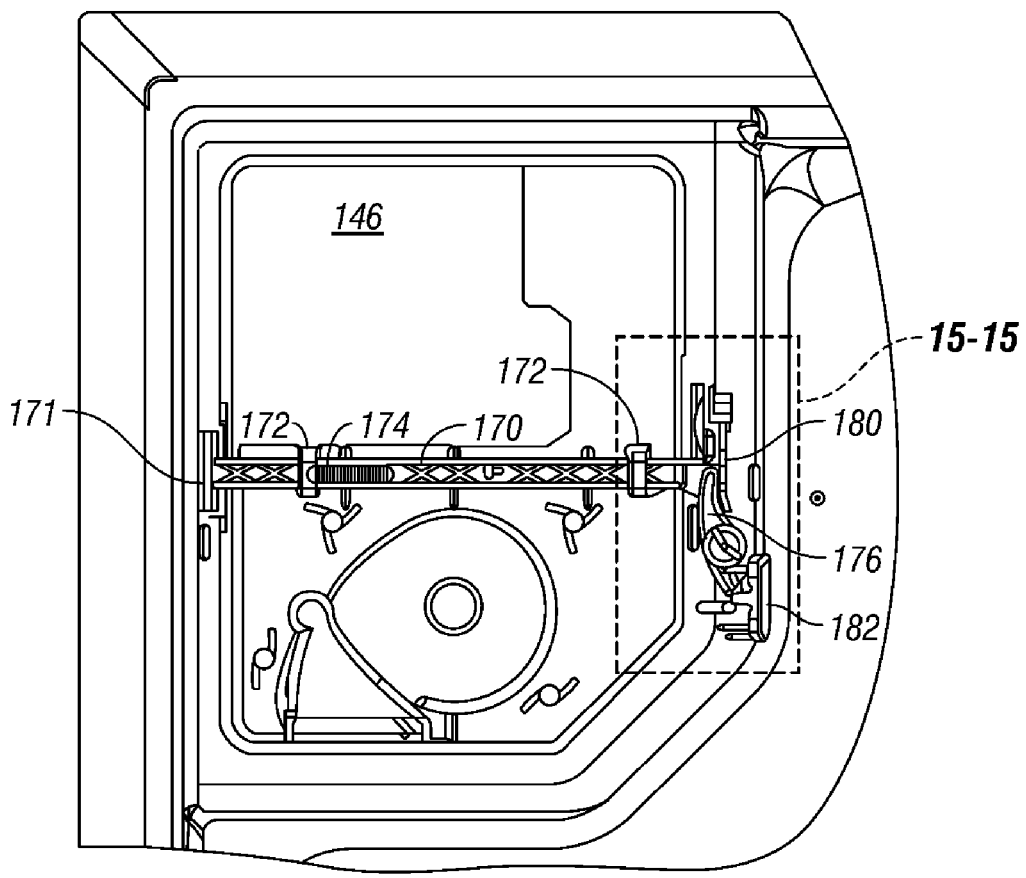
FIG. 14 is an elevation view of the ice bin assembly latch in the locked position.
Figure 15:
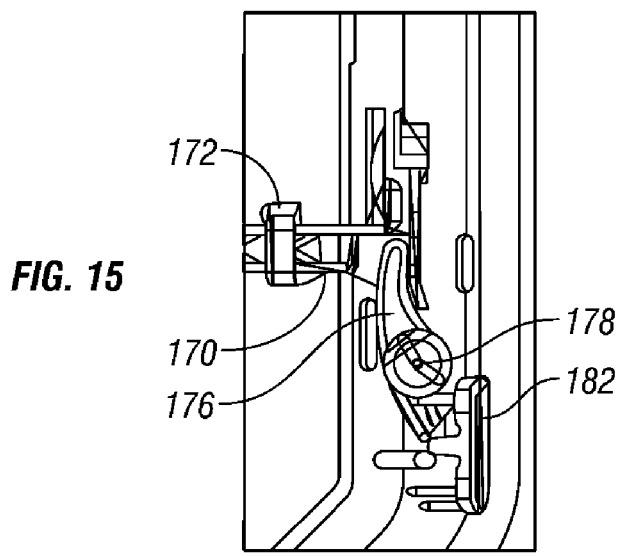
FIG. 15 is an enlarged view taken along lines 15-15 of FIG. 14.
Figure 16:
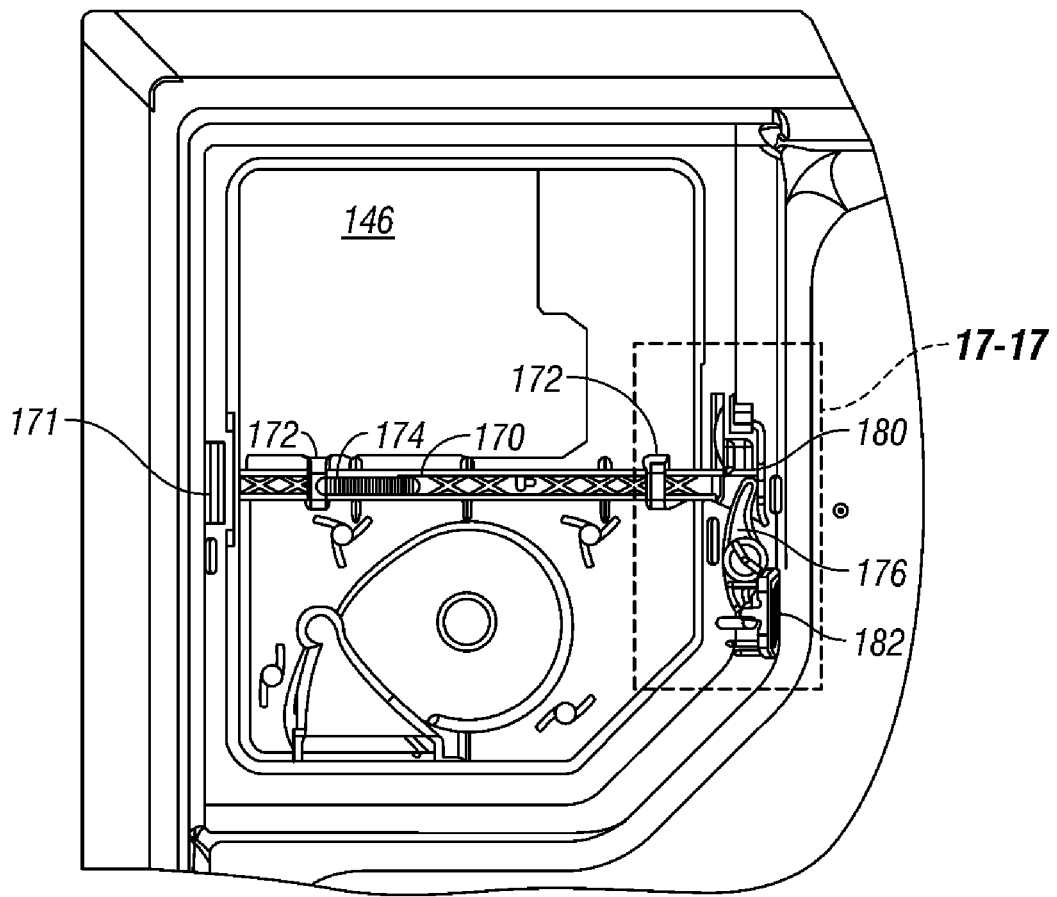
FIG. 16 is an elevation view of the ice bin assembly latch in the unlocked position.
Figure 17:
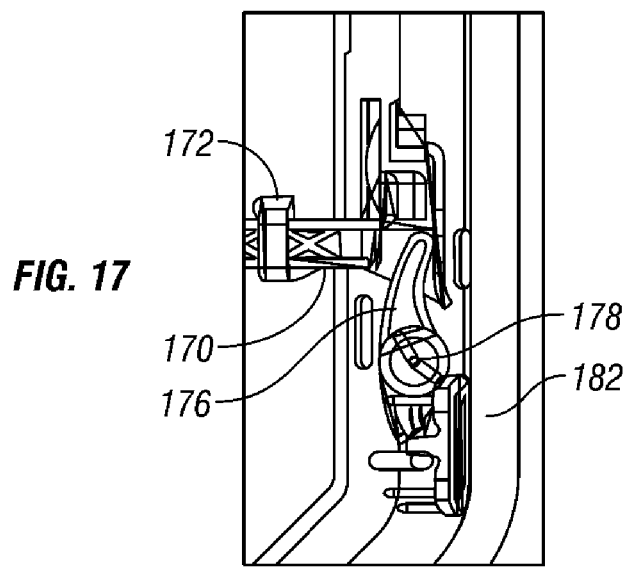
FIG. 17 is an enlarged view taken along lines 17-17 of FIG. 16.
Figure 18:
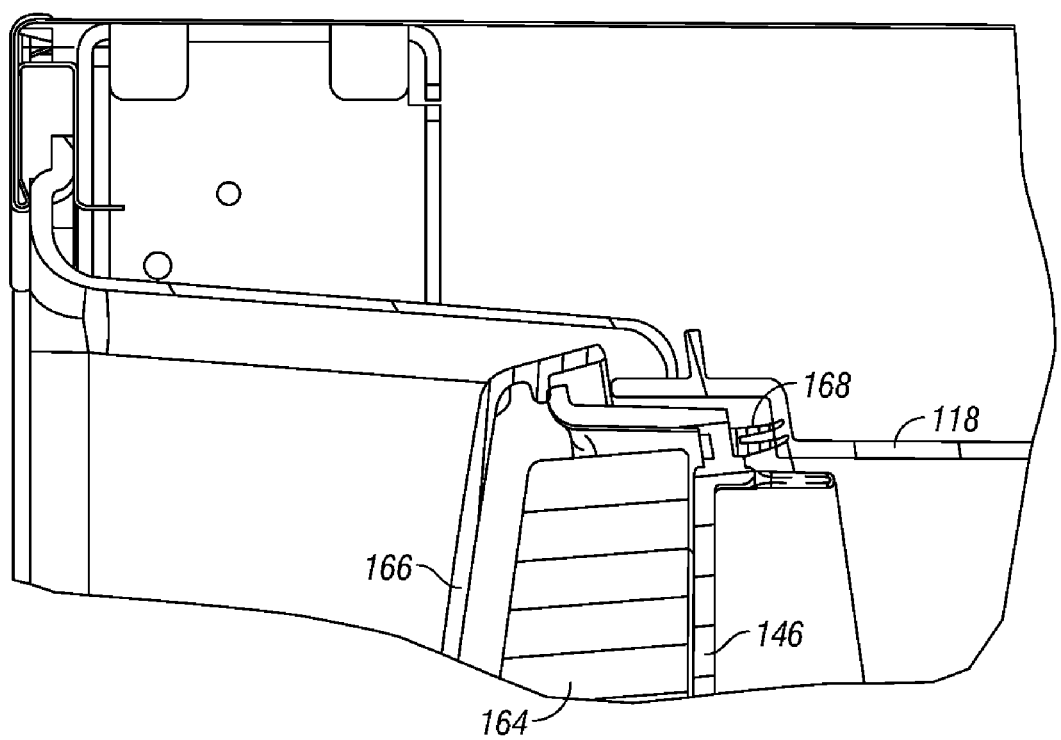
FIG. 18 is an enlarged partial view of the ice bin assembly seal.

The front cover 162 includes a latch mechanism for releasably locking the cover 162 to the ice compartment 22. The latch mechanism includes a lock bar 170 extending through a pair of collars 172 on the front plate 146 of the bin, assembly 130 for lateral sliding movement between a locked position engaging a catch 171 on the wall of the ice compartment 22 (FIG. 14) and unlocked position disengaged from the catch 171 (FIG. 16). The lock bar 170 is normally biased to the locked position by a spring 174. A cam 176 is mounted on a peg 178 on the front plate 146 of the bin assembly 130 and is adapted to engage a flange or finger 180 on the end of the lock bar 170. The cam 176 overcomes the bias of the spring 174 when actuated by a finger button 182 mounted on the outer panel 166, so as to release the front cover 162 for removal of the bin assembly 130. Thus, the bin assembly 130 can be slid into the ice box 122 and positively retained by the latch bar 170 with an air-tight seal to maintain the temperature of the ice compartment 22. A user can depress the button 182 on the bin assembly 130 to unlock the lock bar 170 for removal of the bin assembly 130 from the ice box 122. The seal 168 prevents air movement at the juncture of the removable bin assembly 130 and the ice compartment 22. The latch bar 170 ensures that the bin assembly 130 is positively retained (FIGS. 14 and 15) when closed with a slight compression of the gasket seal 168 (FIG. 18).

Miscellaneous

Applicant's co-pending provisional application, Ser. No. 60/613,241 filed Sep. 27, 2004, entitled APPARATUS AND METHOD FOR DISPENSING ICE FROM A BOTTOM MOUNT REFRIGERATOR, is hereby incorporated by reference in its entirety. This application and the provisional application both relate to a refrigerator with a bottom mount freezer and an icemaking compartment for making ice at a location remote from the freezer. However, it is understood that the ice compartment latch and seal of this application can also be used on a top mount or side-by-side refrigerator.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A refrigerator comprising:
   a cabinet;
   an ice compartment within the cabinet;

an ice maker for providing ice to the ice compartment;

an ice bin slidably received within the ice compartment for retaining ice made by the ice maker;

a latch member adjustably attached to the ice bin to move between a locked position and an unlocked position;

a biasing element for biasing the latch member towards the locked position;

a catch at a fixed location within the ice compartment for engagement with the latch member in the locked position to retain the ice bin in the ice compartment when the latch member is in the locked position and for disengagement from the latch member when the latch member is in the unlocked position to permit slidable removal of the ice bin with attached latch member.

2. The refrigerator of claim 1, further comprising a cam on the bin that engages the latch member and pivots to move the latch member into the unlocked position.

3. The refrigerator of claim 2, further comprising a push button in engagement with the cam for pivoting the cam to move the latch into the unlocked position.

4. The refrigerator of claim 1, further comprising a gasket between the bin and the ice compartment, and wherein when the latch member is in the locked position engaged with the latch, the latch member retains the gasket in a compressed condition to provide an air tight seal between the bin and the ice compartment.

5. A refrigerator comprising:

a cabinet;

an ice compartment within the cabinet;

an ice maker for providing ice to the ice compartment;

an ice bin assembly slidably received within the ice compartment for retaining ice made by the ice maker;

a latch member adjustably attached to the ice bin assembly to move between a locked position and an unlocked position;

a catch at a fixed location within the ice compartment for engagement with the latch member in the locked position to retain the ice bin assembly in the ice compartment when the latch member is in the locked position and for disengagement from the latch member when the latch member is in the unlocked position to permit slidable removal of the ice bin assembly with attached latch member.

6. The refrigerator of claim 5, further comprising a cam on the bin that engages the latch member and pivots to move the latch member into the unlocked position.

7. The refrigerator of claim 6, further comprising a push button in engagement with the cam for pivoting the cam to move the latch into the unlocked position.

8. The refrigerator of claim 5, further comprising a gasket between the bin and the ice compartment, and wherein when the latch member is in the locked position engaged with the latch, the latch member retains the gasket in a compressed condition to provide an air tight seal between the bin and the ice compartment.

9. The refrigerator of claim 5, further comprising a biasing element for biasing the latch member towards the locked position.

* * * * *

UNITED STATES PATENT AND TRADEMARK OFFICE
CERTIFICATE OF CORRECTION

PATENT NO. : 7,594,413 B2  Page 1 of 1
APPLICATION NO. : 11/421779
DATED : September 29, 2009
INVENTOR(S) : Martin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Twenty-eighth Day of September, 2010

David J. Kappos
*Director of the United States Patent and Trademark Office*